United States Patent [19]

Freudenberger

[11] 3,722,907
[45] Mar. 27, 1973

[54] STEERING IDLER ARM BRACKET

[75] Inventor: John E. Freudenberger, West Unity, Ohio

[73] Assignee: Power and Sons, Montpelier, Ohio

[22] Filed: June 11, 1971

[21] Appl. No.: 152,221

[52] U.S. Cl. .................................. 280/95 A, 287/93
[51] Int. Cl. .............................................. B62d 7/16
[58] Field of Search .............. 280/95 I, 95 R; 287/93; 308/237 A, 238

[56] References Cited

UNITED STATES PATENTS

| | | | |
|---|---|---|---|
| 2,995,381 | 8/1961 | Melton et al. | 280/95 |
| 3,356,426 | 12/1967 | Fadow | 287/93 X |
| 3,428,345 | 2/1969 | Ryszewski | 287/93 |

Primary Examiner—Kenneth H. Betts
Assistant Examiner—D. M. Mitchell
Attorney—J. King Harness et al.

[57] ABSTRACT

The idler arm supporting bracket is made from an L-shaped rolled section having a vertical and horizontal flange. A length of the rolled section is cut into narrow strips to form L-shaped supporting elements having a long vertical section and a shorter and thicker horizontal section with a flute of large radius therebetween to provide increased strength between the sections. An aperture in the horizontal section has the flute material cut away thereabout to provide clearance for the head of a pin which is supported in the aperture. The pin has a cylindrical body with a head on one end and a thread on the other end. The pin body has a corrugated section beneath the head which cuts into the wall of the aperture in the horizontal section when the pin is forced thereinto. The bracket and pin form a rigid unit which is attached to the righthand rail member of a vehicle frame for supporting the idler arm of the steering mechanism on the cylindrical body of the pin.

2 Claims, 3 Drawing Figures

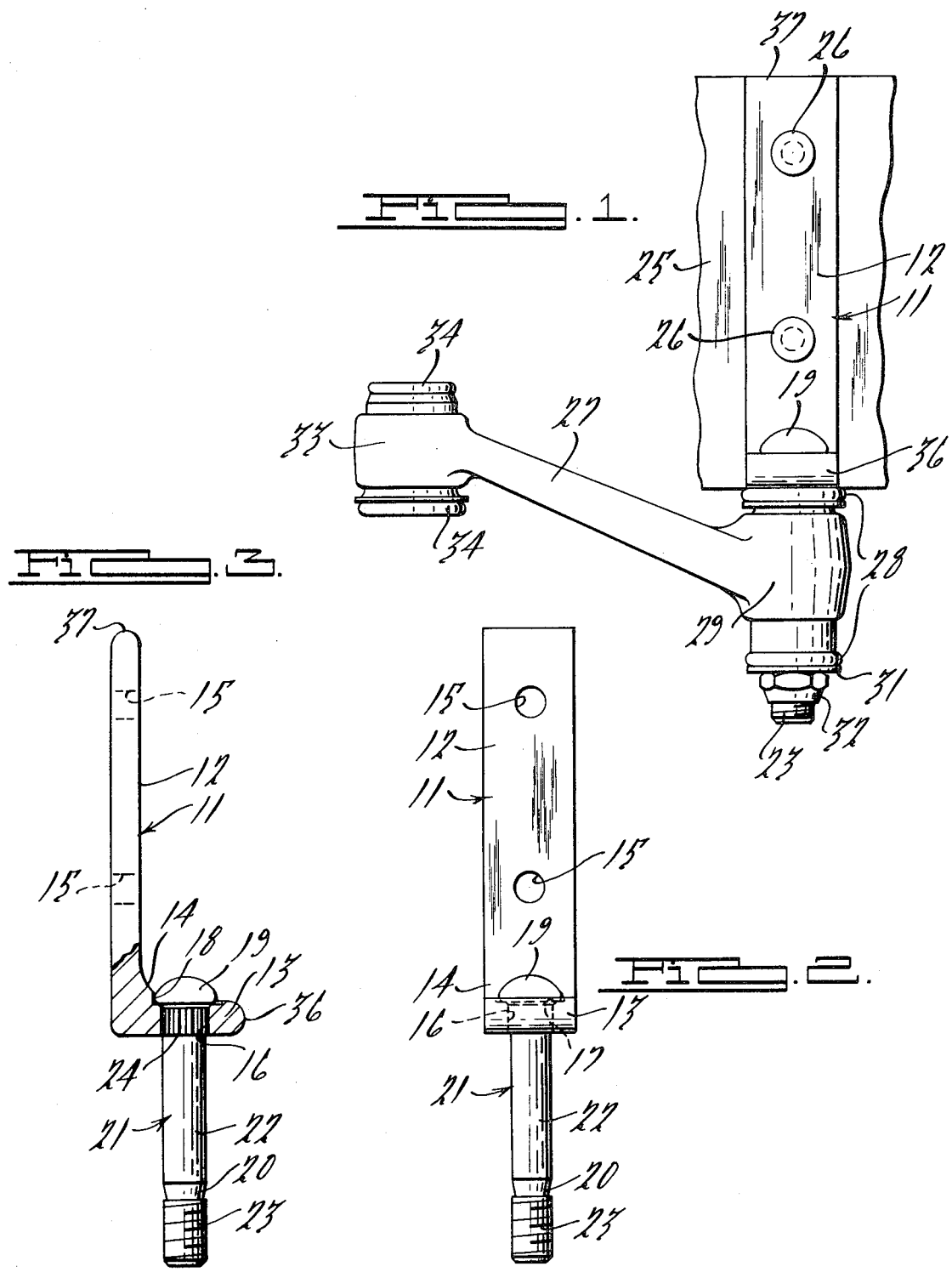

STEERING IDLER ARM BRACKET

BACKGROUND OF THE INVENTION

Supporting brackets had been heretofore constructed from a forging which required a substantial amount of machining and the use of a selected steel for all parts thereof.

SUMMARY OF THE INVENTION

The invention pertains to an idler arm bracket and method of construction which embodies an L-shaped supporting element for a cylindrical pin on which the idler arm is pivoted. The element is made from a strip cut from a rolled L-shaped steel member having a vertical section and a shorter horizontal section with a flute therebetween which provides added strength thereto. The horizontal section contains an aperture for receiving a pin on which the idler arm pivots. The horizontal section is thicker than the vertical section and the flute therebetween adds strength to the junction of the two sections. The metal of the flute about the aperture is face milled to provide clearance for the pin head.

The pin has a cylindrical body with a head on one end and a threaded section on the opposite end and with corrugations extending outwardly beneath the head for a length substantially equal to the thickness of the horizontal section. The corrugations are forced into the wall of the aperture in the horizontal section to be in firm fixed non-rotatable relation therewith. The vertical section has a pair of spaced apertures punched or otherwise provided therein in exact aligned relation with each other and with the center of the aperture in the horizontal section. The vertical section is riveted or otherwise secured to the righthand rail of the vehicle frame for pivotally supporting the idler arm of the steering mechanism on the downwardly extending body of the pin.

BRIEF DESCRIPTION OF THE DRAWING

FIG. 1 is a view in elevation of a supporting bracket with an idler arm thereon, which bracket embodies features of the present invention;

FIG. 2 is a view of the idler arm supporting bracket illustrated in FIG. 1, and

FIG. 3 is a side view, with a part in section, of the bracket illustrated in FIG. 2.

DESCRIPTION OF THE PREFERRED EMBODIMENT

The bracket of the present invention embodies an L-shaped supporting element 11 having a vertical section 12 and a horizontal section 13 with the horizontal section 13 of thicker material than the vertical section 12. The supporting element 11 is cut from a length of a rolled stock having a shape the same as the supporting element 11 which includes a flute 14 between the sections 12 and 13 to provide strength. All of the severed elements 11 are of like form having a pair of apertures 15 punched or otherwise provided in the vertical section 12 in aligned relation with the center of an aperture 16 drilled or otherwise provided in the horizontal section 13. A chamfer 17 is provided at the top of the aperture 16 and the area about the aperture is face milled at 18 to form clearance and a seat for a head 19 of a pin 21. The pin is preferably formed by a heading and rolling operation to have a cylindrical body 22 and a threaded end 23 which is relieved at 20. Outwardly extending serrations 24 are provided on the body 22 beneath the head 19 which cut into the wall of the aperture 16 to firmly secure the pin 21 therein and to prevent it from rotation. With this arrangement, the central axis of the pin falls on a plane through the center of the apertures 15.

As illustrated in FIG. 1, the supporting element 12 is secured to the righthand rail 25 of a vehicle frame by suitable means, herein illustrated as by rivets 26. An idler arm 27 has bushings 28 in an end hub 29 which receives the cylindrical body 22 of the pin 21 and on which it is secured in pivotal relation by a washer 31 and nut 32. A hub 33 on the opposite end of the arm similarly is provided with bushings 34 to which linkage is pivotally secured in the conventional manner.

The supporting element 12 is severed from a length of rolled steel, such as SAE 1038, and treated to have a Brinell Hardness of 180 to 240. The pin 21 is made from a medium steel such as SAE 1035 treated to have the properties of a Grade 5 bolt. The top edge 37 of the vertical section 12 is arcuately shaped the same as the edge 36 of the horizontal section 13. The two sections 12 and 13 are constructed and treated in a manner to provide properties best suited for the functions which they perform. The bracket thus provided is more durable, cheaper and reliable than the forged bracket heretofore employed.

I claim:

1. In an idler arm supporting bracket, a supporting element of narrow width cut from a length of an L-shaped member, the element has a vertical section and a thicker horizontal section with a flute therebetween for adding strength, the horizontal section has an aperture extending therethrough with the flute material thereabout cut away to provide clearance for the head of a pin, and a pin having a cylindrical body with a head at one end and a threaded section at the other end and with serrations extending outwardly of the body directly beneath the head in position to cut into the wall of the aperture when forced downwardly thereinto in unit fixed relation therewith to form a pivotal support for an idler arm.

2. In an idler arm supporting bracket as recited in claim 1, wherein said element and pin are made from different grades of steel.

* * * * *